US010953994B2

(12) United States Patent
Volny et al.

(10) Patent No.: US 10,953,994 B2
(45) Date of Patent: Mar. 23, 2021

(54) AIRCRAFT EVACUATION SYSTEM WITH AN INTEGRATED SPOILER

(71) Applicant: Goodrich Corporation, Charlotte, NC (US)

(72) Inventors: Jaro S. Volny, Scottsdale, AZ (US); Drew Hartman, Phoenix, AZ (US)

(73) Assignee: Goodrich Corporation, Charlotte, NC (US)

( * ) Notice: Subject to any disclaimer, the term of this patent is extended or adjusted under 35 U.S.C. 154(b) by 757 days.

(21) Appl. No.: 15/703,722

(22) Filed: Sep. 13, 2017

(65) Prior Publication Data

US 2019/0077515 A1    Mar. 14, 2019

(51) Int. Cl.
*B64D 25/14*    (2006.01)
*A62B 1/20*    (2006.01)

(52) U.S. Cl.
CPC ............... *B64D 25/14* (2013.01); *A62B 1/20* (2013.01)

(58) Field of Classification Search
CPC ........ B64D 25/14; B64D 25/08; B64D 25/00; B64D 2201/00; A62B 1/20
See application file for complete search history.

(56) References Cited

U.S. PATENT DOCUMENTS

| 3,370,684 | A | * | 2/1968 | Holcombe | ............... A62B 1/20 193/25 B |
| 5,820,773 | A | * | 10/1998 | Hintzman | .............. B64D 25/14 244/137.2 |
| 6,799,741 | B2 | * | 10/2004 | Danielson | ................ A62B 1/20 182/48 |
| 2004/0118979 | A1 | * | 6/2004 | Moro | ..................... B64D 25/14 244/137.2 |

* cited by examiner

*Primary Examiner* — Assres H Woldemaryam
(74) *Attorney, Agent, or Firm* — Snell & Wilmer L.L.P.

(57) ABSTRACT

An integrated spoiler may comprise a side tube having a tube wall, wherein the tube wall has a first edge and a second edge, wherein the first edge is disposed proximate a portion of the tube wall; a seam proximate the first edge and the portion of the tube wall; a coupling across the seam configured to inhibit the exchange of gas across the seam; a flap comprising the second edge and extending outward of the seam; and a ligament. The flap may further comprise an angle θ between the flap and an outer surface of the tube wall wherein the ligament is configured to restrain angle θ at a maximum. The flap may be configured to pivot about the seam through angle θ in response to an aerodynamic force.

17 Claims, 7 Drawing Sheets

AIRCRAFT EVACUATION SYSTEM WITH AN INTEGRATED SPOILER

FIELD

The present disclosure relates to inflatable evacuation slides and, in particular, to inflatable evacuation slides having integrated aerodynamic lift spoilers.

BACKGROUND

Emergency evacuation slides may be used to exit an aircraft absent a jet way or other suitable means of egress for passengers. The slides may deploy from a door sill or a side of the aircraft fuselage, for example. High winds tend to apply aerodynamic forces on the slide which tend to inhibit proper deployment of the slide and tend to lift the foot of the slide away from the ground.

SUMMARY

In various embodiments, an integrated spoiler is provided. An integrated spoiler may comprise a side tube having a tube wall, wherein the tube wall has a first edge and a second edge, wherein the first edge is disposed proximate a portion of the tube wall, a seam proximate the first edge and the portion of the tube wall, a coupling across the seam configured to inhibit an exchange of a gas across the seam, a flap comprising the second edge and extending outward of the seam, and a ligament.

In various embodiments, the flap may further comprise an angle $\theta$ between the flap and an outer surface of the tube wall wherein the ligament is configured to restrain the angle $\theta$ at a maximum. The flap may be configured to pivot about the seam through the angle $\theta$ in response to an aerodynamic force. In various embodiments, the flap may further comprise a first dimension W perpendicular to the second edge and extending from the seam a distance of less than eight inches. In various embodiments the side tube comprises a second dimension D parallel to the side tube and wherein the flap extends along the seam over a percentage of the second dimension D. In various embodiments, the first dimension W varies with respect to the second dimension D by a variation. In various embodiments, the variation of the first dimension W with respect to the second dimension D is linear. In various embodiments, the coupling comprises a two part adhesive.

In various embodiments, an evacuation system for an aircraft structure is provided. An evacuation system for an aircraft structure may comprise an evacuation slide coupled to the aircraft structure. The evacuation slide may comprise a first side tube a first side tube having a first tube wall, a second side tube having a second tube wall, the second side tube and the first side tube defining a lane, a tube extending between the first side tube and the second side tube; and a first integrated spoiler. The first integrated spoiler may comprise the first tube wall, further comprising a first edge and a second edge, wherein the first edge is disposed proximate a portion of the first tube wall, a first seam proximate the first edge and the portion of the first tube wall, a first coupling across the first seam configured to inhibit the exchange of a gas across the first seam, a first flap comprising the second edge and extending outward of the first seam, and a first ligament.

In various embodiments, an evacuation system for an aircraft structure may further comprise a second integrated spoiler. The second integrated spoiler may comprise the second tube wall, further comprising a third edge and a fourth edge, wherein the third edge is disposed proximate a portion of the second tube wall, a second seam proximate the third edge and the portion of the second tube wall, a second coupling across the second seam configured to inhibit an exchange of a gas across the second seam, a second flap comprising the fourth edge and extending outward of the second seam, and a second ligament. In various embodiments, the first flap further comprises an angle $\theta$ between the first flap and an outer surface of the first tube wall wherein the first ligament is configured to restrain the angle $\theta$ at a maximum. In various embodiments the first flap is configured to pivot about the first seam through the angle $\theta$ in response to an aerodynamic force. In various embodiments, the first flap further comprises a first dimension W perpendicular to the second edge and extending from the first seam a distance of less than eight inches. In various embodiments, the first side tube comprises a second dimension D parallel to the first side tube and wherein the first flap extends along the first seam over a percentage of the second dimension D. In various embodiments, the first dimension W varies with respect to the second dimension D by a variation. In various embodiments, an evacuation system for an aircraft structure may further comprise a center tube disposed between the first side tube and the second side tube, the first side tube and the center tube defining a first lane; the center side tube and the second side tube defining a second lane. In various embodiments, the first side tube, the second side tube, and the first flap are substantially in parallel.

In various embodiments, a method for manufacturing an integrated spoiler is provided. The method may comprise forming a tube wall having a first edge and a second edge; forming a seam, wherein forming the seam comprises disposing the first edge proximate a portion of the tube wall; and forming a flap, wherein forming the flap comprises extending the second edge outward of the seam by a first distance W and coupling the first edge to the portion of the tube wall.

In various embodiments, the method may further comprise extending the flap along the seam by a second distance D and configuring the flap to pivot about the seam in response to an aerodynamic force. The method may further comprise varying the first distance W with respect to the second distance D.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation. The steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface cross hatching lines may be used throughout the figures to denote different parts but not necessarily to denote the same or different materials.

Slides according to the present disclosure may extend from an aircraft structure, such as a fuselage or a wing, for example, to an exit surface. An integrated spoiler is provided to, among other things, counteract aerodynamic forces tending to lift the toe end of the slide away from the ground. The slide may comprise a dual lane slide comprising two side tubes and a center tube extending parallel to the lanes. The integrated spoiler may be provided from excess tube wall material at the seams of the two side tubes and run from the head to the foot of the slide. In this regard the spoiler is integrated with the side tube. An arched dropdown tube may be coupled between the two side tubes and may contact the center tube when the dual lane slide is inflated. Straps may couple the arched dropdown tube to the center tube. In this regard, the arched dropdown tube arrangement may form a truss structure with the slide for load distribution. In this regard, the arched dropdown tube and strap may increase structural integrity (i.e., beam strength or stiffness of the slide) while tending to minimize weight and pack volume of the slide.

Figure 1A:
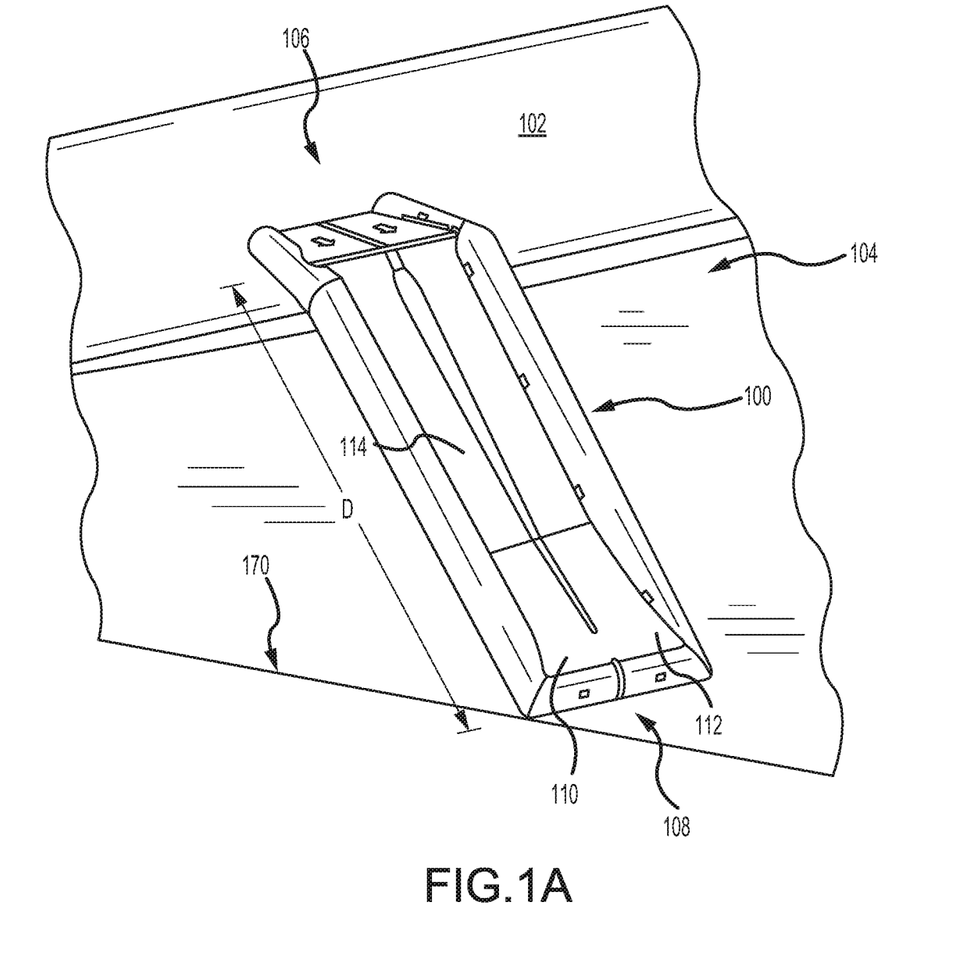
FIG. 1A illustrates a perspective view of an evacuation slide in a deployed position, in accordance with various embodiments.
Figure 1B:
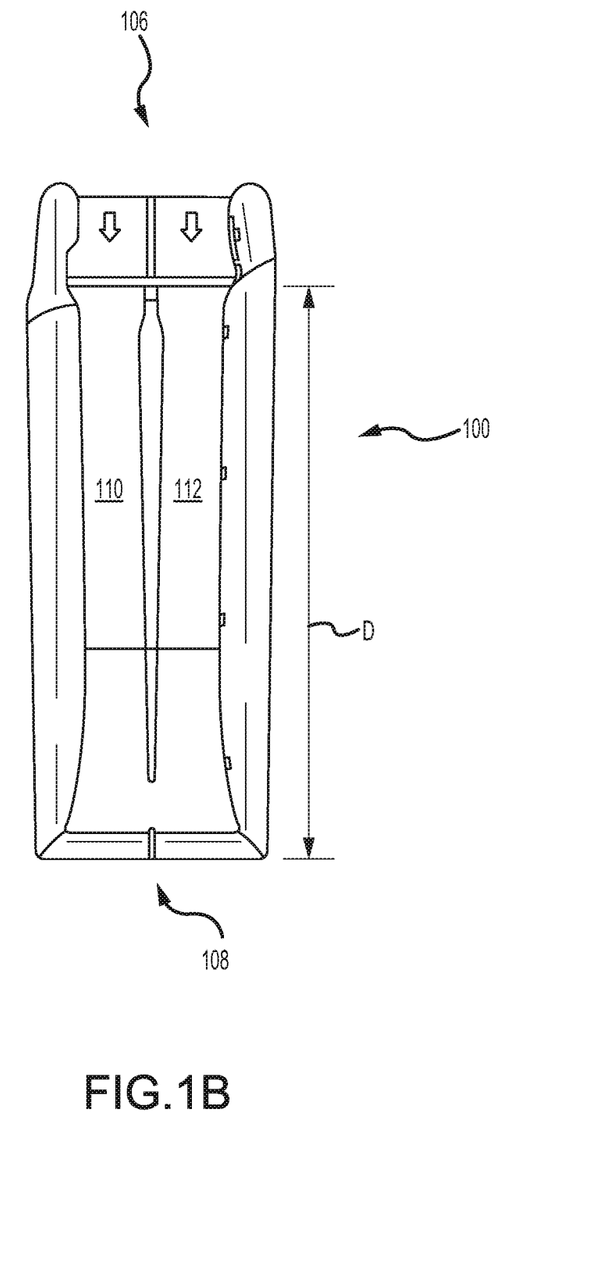
FIG. 1B illustrates a top view of an inflated evacuation slide, in accordance with various embodiments.
Figure 2:
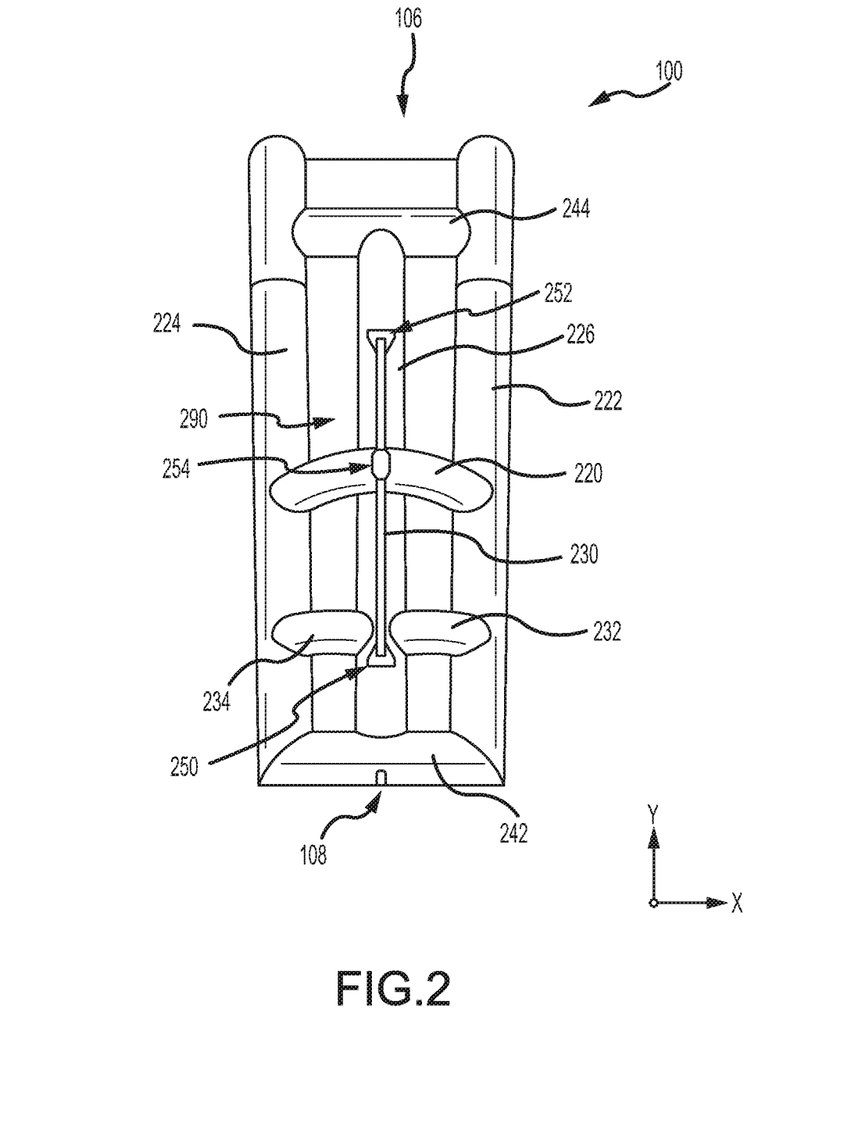
FIG. 2 illustrates a bottom view of an inflated evacuation slide, in accordance with various embodiments.
Figure 3:
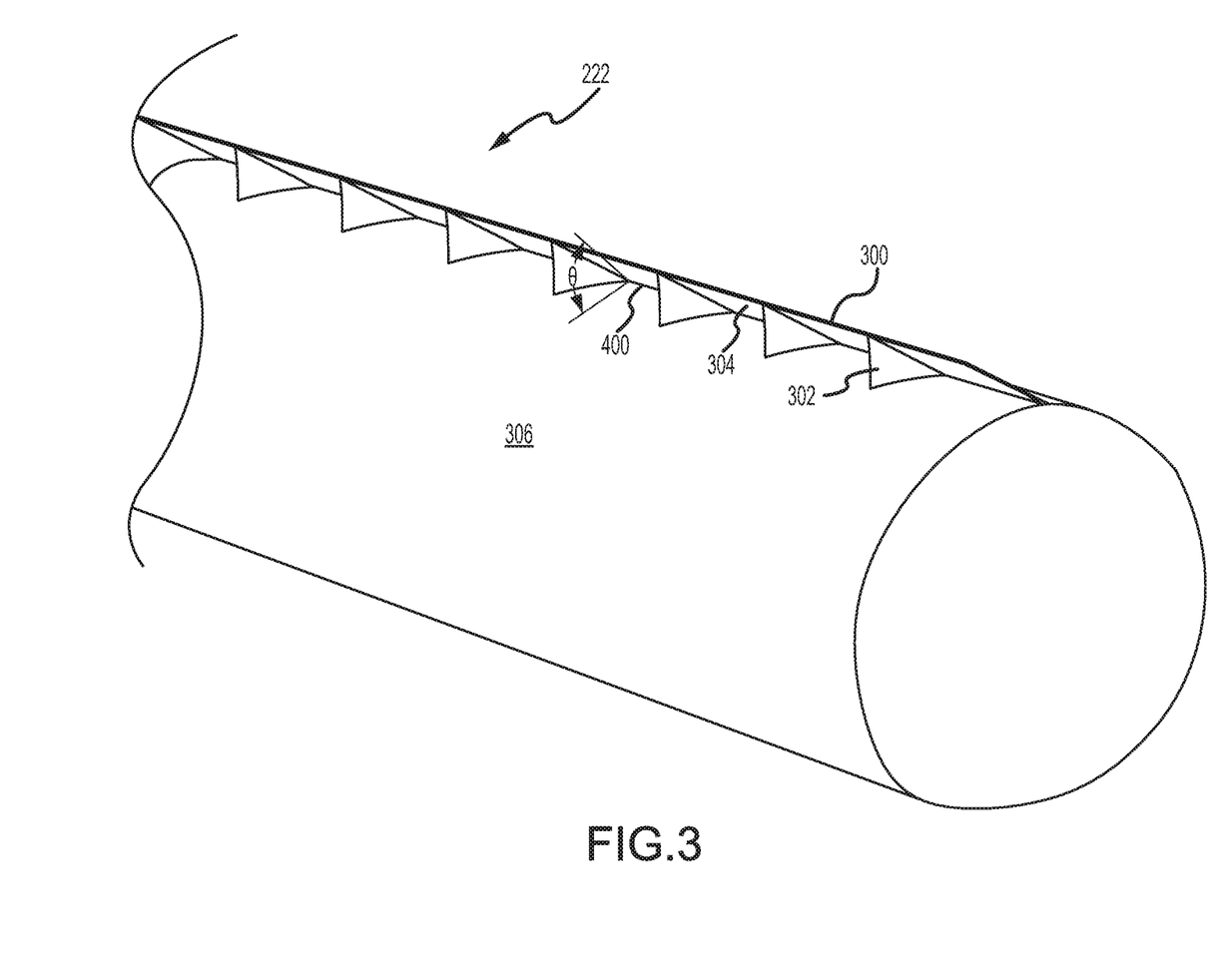
FIG. 3 illustrates a section through an inflated evacuation slide having an integrated spoiler, in accordance with various embodiments.

With respect to FIG. 2, elements with like element numbering, as depicted in FIG. 1A and FIG. 1B, are intended to be the same and will not necessarily be repeated for the sake of clarity. With respect to FIG. 3 through FIG. 5, elements with like element numbering, as depicted in FIG. 1A through FIG. 2, are intended to be the same and will not necessarily be repeated for the sake of clarity. With respect to FIG. 4, elements with like element numbering, as depicted in FIG. 3, are intended to be the same and will not necessarily be repeated for the sake of clarity.

With combined reference to FIG. 1A and FIG. 1B, an evacuation system 104 is illustrated, in accordance with various embodiments. Evacuation system 104 may comprise evacuation slide 100 coupled to an aircraft structure 102. Evacuation slide 100 may comprise a head end 106 and a toe end 108. Head end 106 may be coupled to aircraft structure 102. In various embodiments, aircraft structure 102 may comprise a fuselage, a fairing, a wing, or any other portion of an aircraft. FIG. 1A and FIG. 1B illustrate evacuation slide 100 in a deployed position. Evacuation slide 100 may comprise an inflatable slide. FIG. 1A and FIG. 1B illustrate evacuation slide 100 in an inflated position. Evacuation slide 100 may comprise a dual lane slide comprising a first lane 110 and a second lane 112. Toe end 108 may contact an exit surface 170 in response to evacuation slide 100 being deployed. In various embodiments, evacuation slide 100 may be inflated in response to opening an emergency exit door. Evacuation slide 100 may comprise a sliding surface 114.

With reference to FIG. 2, a bottom view of evacuation slide 100 is shown having an arched tube 220. An xyz-axes is provided for ease of illustration. As used herein, the bottom side 290 of evacuation slide 100 may be the underside of evacuation slide 100, or the side of evacuation slide 100 opposite the sliding surface 114 (see FIG. 1). Arched tube 220 may be coupled between side tube (also referred to herein as first side tube) 222 and side tube (also referred to herein as second side tube) 224. With brief reference to FIG. 1B, a side tube may comprise a dimension D. Dimension D may comprise the length of sliding surface 114 and a side tube may extend along dimension D. Dimension D may comprise the length of the sloped portion of evacuation slide 100, in response to evacuation slide 100 being in the deployed or inflated position, as illustrated in FIG. 1A. Arched tube 220 may be located at the bottom side 290 of evacuation slide 100. Center tube 226 may be located between side tube 222 and side tube 224. Side tube 222, side tube 224, and center tube 226 may be disposed in parallel. Stated another way, side tube 222, side tube 224, and center tube 226 may each extend in a similar direction (i.e., in the y-direction) (also referred to herein as a first direction). Side tube 222, side tube 224, and center tube 226 may each extend in the xy-plane (also referred to herein as a first plane). Side tube 222, side tube 224, and center tube 226 may be coupled together at toe end 108 via cross tube 242. Cross tube 242 may be in contact with the exit surface (i.e., exit surface 170 of FIG. 1A) in response to evacuation slide 100 being deployed. Side tube 222, side tube 224, and center tube 226 may be coupled together at head end 106 via cross tube 244.

In various embodiments, sliding surface 114 may be disposed between first side tube 222 and second side tube 224. Side tube 222 and center tube 226 may at least partially define first lane 110 (see FIG. 1). Side tube 224 and center tube 226 may at least partially define second lane 112 (see FIG. 1). In various embodiments, arched tube 220 may extend substantially orthogonal (i.e., in the x-direction) to side tube 222, side tube 224, and/or center tube 226. In various embodiments, arched tube 220 may extend in the xz-plane (also referred to herein as a second plane) as illustrated in FIG. 2.

In various embodiments and with continued reference to FIG. 2, strap 230 may be coupled to center tube 226 at location 250 and location 252. In various embodiments, strap 230 may be attached to center tube 226 via an adhesive or glue or other coupling known to those skilled in the art. Strap 230 may be coupled to arched tube 220 at location 254. In various embodiments, strap 230 may be attached to arched tube 220 via an adhesive or glue or other coupling known to those skilled in the art. In various embodiments, strap 230 may comprise a single unitary strap. In various embodiments, strap 230 may comprise two separate straps. For example a first strap may be coupled between location 254 and location 250 and a second strap may be coupled between location 254 and location 252. When viewing evacuation slide 100 from the bottom, strap 230 extends in a direction (i.e., the y-direction) parallel with center tube 226, as illustrated in FIG. 2.

In various embodiments, strap 230 may comprise a rope, tape, ribbon, webbing, or any other suitable strap. In various embodiments, strap 230 may comprise a corded or woven strap. In various embodiments, strap 230 may comprise an elastomer. In various embodiments, strap 230 may comprise nylon, ballistic nylon, polypropylene, polyester, cotton, or any other suitable material.

In various embodiments, evacuation slide 100 may comprise ground support tube 232 and ground support tube 234. Ground support tube 232 may be coupled between side tube 222 and center tube 226. Ground support tube 234 may be coupled between side tube 224 and center tube 226. Ground support tube 232 may comprise an arched tube. Ground support tube 234 may comprise an arched tube. Ground support tube 232 and ground support tube 234 may be located at the bottom side 290 of evacuation slide 100.

In various embodiments, ground support tubes 232, 234 may be configured to contact the ground in response to an evacuee sliding down evacuation slide 100 near toe end 108. Ground support tubes 232, 234 may prevent evacuation slide 100 from deflecting and/or buckling. Ground support tubes 232, 234 may provide a spring force on toe end 108 in response to the evacuee reaching the toe end 108 of evacuation slide 100 which may aid said evacuee exit evacuation slide 100.

With reference to FIGS. 3A and 3B, a section through side tube 222 is shown having an integrated spoiler 300. Integrated spoiler 300 may comprise flap 304 and ligament 302 coupled between flap 304 and outer surface 306 of tube 222. In various embodiments, flap 304 may comprise an angle theta (θ) relative to outer surface 306. An aerodynamic force, such as that which may be generated by airflow across side tube 222 toward second flap 304, tends to pivot flap 304 upward or, in other words, tends to rotate flap 304 away from outer surface 306, causing theta to increase through angle θ where ligament 302 tends to restrain angle θ at a maximum.

Figure 4:
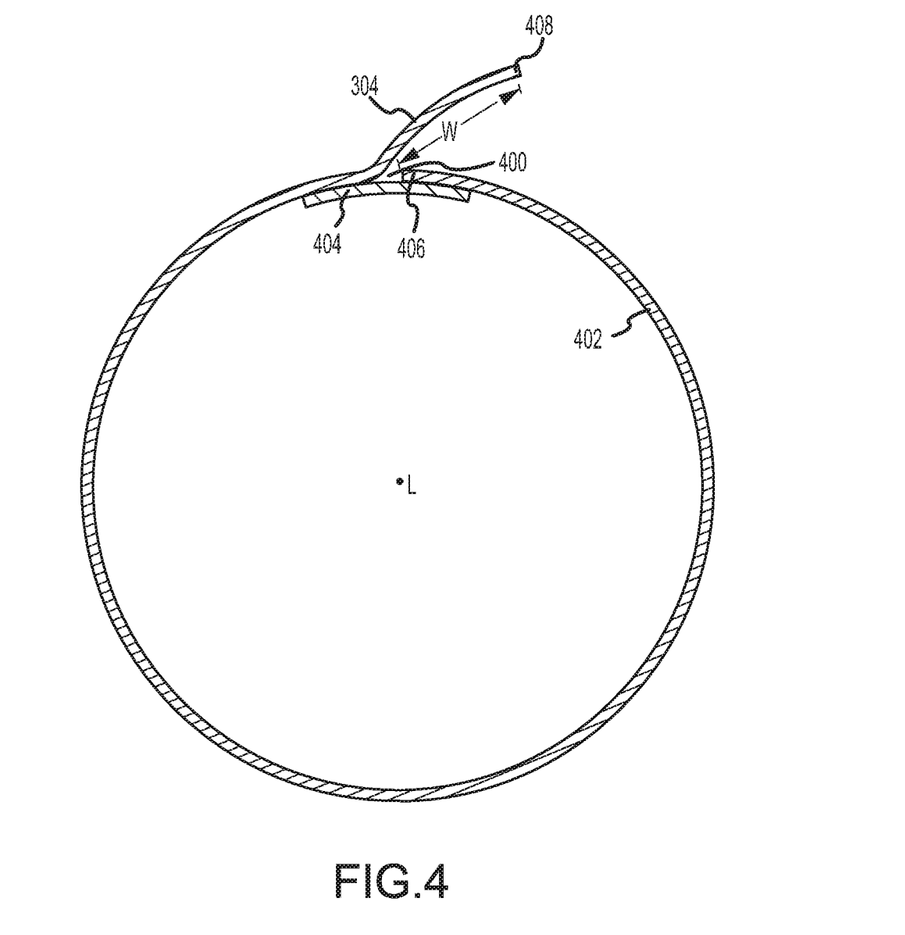
FIG. 4 illustrates a section through an inflated evacuation slide having an integrated spoiler, in accordance with various embodiments.

With combined reference to FIGS. 2 and 4, a section through side tube 222 perpendicular to the y-axis is shown having an integrated spoiler. Side tube 222 comprises a tube wall 402 having a first edge 406 and a second edge 408. Tube wall 402 wraps circumferentially about a central axis L and extends along the y-axis. In various embodiments, seam 400 is formed where first edge 406 is disposed proximate a portion of tube wall 402. Flap 304 comprises second edge 408 and extends a distance W beyond first edge 406 tending to form flap 304. In various embodiments, flap 304 comprises a dimension W, perpendicular to second edge 408 and extending from seam 400, which may comprise the width of flap 304. Seam tape 404 is coupled to tube wall 402 across seam 400 tending to couple first edge 406 to a portion of tube wall 402 and inhibit the exchange of a gas across the seam. In various embodiments, seam tape 404 may be referred to as a coupling. Other couplings may include fabric strips, tapes, ribbons, woven structures, and other suitable structures.

In various embodiments tube wall 402 may comprise a thermoplastic synthetic rip-stop polymer such as, for example, nylon, ballistic nylon, polypropylene, polyester, or any other suitable material, and may be selected or treated to be substantially impermeable to gas. In various embodiments seam tape 404 may comprise a similar or like material to tube wall 402. In various embodiments seam tape 404 may be coupled to tube wall 402 by an adhesive bond such as, for example, a two part adhesive, or may be chemically welded. In various embodiments seam tape 404 may be bonded by mechanical welding such as, for example, thermal or ultrasonic welding.

In various embodiments, with combined reference to FIGS. 1A, 1B, 2, 3 and 4, integrated spoiler 300 may formed along seam 400 of a side tube, such as, for example side tube 222. In various embodiments, integrated spoiler 300 may extend along dimension D between zero percent (0%) and one-hundred percent (100%) of dimension D from toe end 108, and in various embodiments, between ten percent (10%) and ninety percent (90%) of dimension D from toe end 108, and in various embodiments, between fifteen percent (15%) and eighty percent (80%) of dimension D from toe end 108. In various embodiments flap 304 may extend a distance W from seam 400 between zero inches (0") [0 cm] and eight inches (8") [20.3 cm], or between two inches (2") [5.1 cm] and seven inches (7") [17.8 cm], or between four inches (4") [10.2 cm] and six inches (6") [15.2 cm]. In various embodiments the distance W may vary linearly with respect to a position along dimension D from toe end 108 to head end 106 of the slide. In various embodiments, seam 400 may be located along an upper surface a side tube, such as side tube 222. In this regard, seam 400 may lie relatively above a lane, such as lane 110, in the z-axis. In various embodiments, in response to an aerodynamic force flap 304 may pivot about seam 400 through angle θ where θ is between zero degrees (0°) and ninety degrees (90°), or between degrees (0°) and sixty degrees (60°), or between degrees (0°) and forty-five degrees (45°), or between degrees (0°) and thirty degrees (30°), or between degrees (0°) and fifteen degrees (15°).

Figure 5:
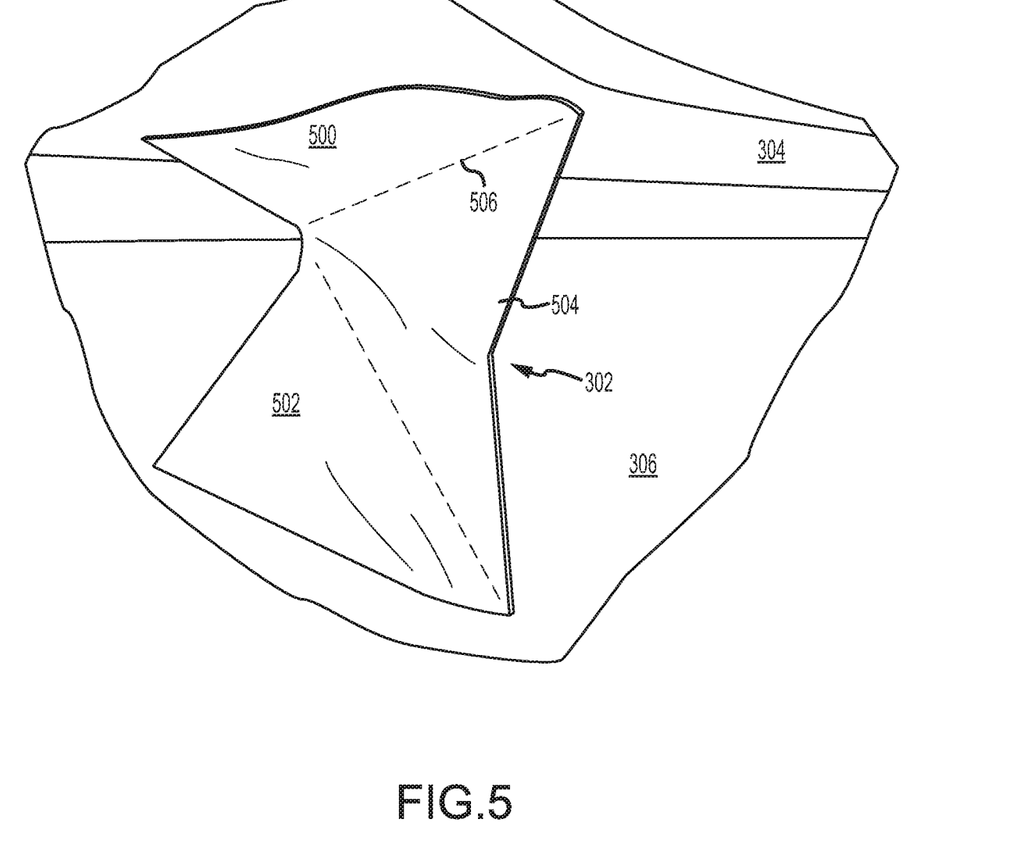
FIG. 5 illustrates a an integrated spoiler, in accordance with various embodiments.

In various embodiments and with reference now to FIG. 5, a ligament 302 comprises an upper gusset 500 and a lower gusset 502 linked by web 504. Upper gusset may be coupled to flap 304 and lower gusset 502 may be coupled to outer surface 306. In various embodiments, upper gusset 500 may be stitched 506 to web 504 and lower gusset 502 may similarly be stitched to web 504. In various embodiments, upper gusset 500, web 504 and lower gusset 502 may be contiguous material with upper gusset 500 and lower gusset 502 disposed opposite each other at distal ends of web 504.

In various embodiments upper gusset 500, lower gusset 502, and web 504 may comprise a thermoplastic synthetic rip-stop polymer such as, for example, nylon, ballistic nylon, polypropylene, polyester, or any other suitable material, and may be selected or treated to be substantially impermeable to gas. In various embodiments upper gusset 500 and lower gusset 502 may be bonded to outer surface 306 by an adhesive bond or glue such as, for example, a two part adhesive, or may be chemically welded. In various embodiments upper gusset 500 and lower gusset 502 may be bonded by mechanical welding such as, for example, thermal or ultrasonic welding. In various embodiments, web 504 may comprise a rope, tape, ribbon, webbing, or any other suitable strap. In various embodiments, web 504 may comprise a corded or woven strap. In various embodiments, web 504 may comprise an elastomer.

Figure 6:
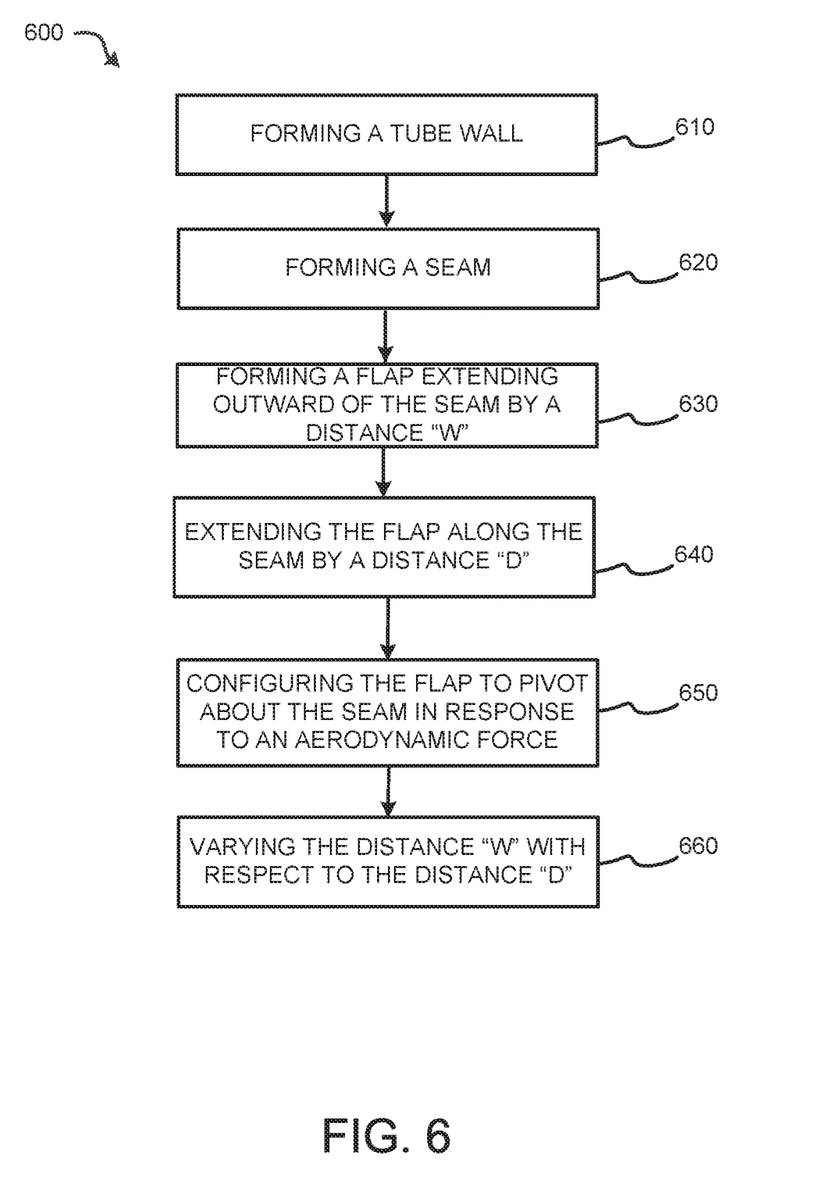
FIG. 6 illustrates a method of manufacturing an integrated spoiler, in accordance with various embodiments.

With reference to FIG. 6, a method 600 of manufacturing an integrated spoiler is provided, in accordance with various embodiments. Method 600 comprises forming a tube wall (step 610) having a first edge and a second edge; forming a seam (step 620) wherein forming the seam comprises disposing the first edge proximate a portion of the tube wall; and forming a flap (step 630), wherein forming the flap comprises extending the second edge outward of the seam by a distance W and coupling the first edge to the portion of the tube wall. The method may further comprise extending the flap (step 640) along the seam by a distance D and configuring the flap to pivot about the seam (step 650) in response to an aerodynamic force. The method may further comprise varying the distance W with respect to the distance D (step 660).

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An aircraft evacuation system integrated spoiler comprising: a side tube having a tube wall, wherein the tube wall has a first edge and a second edge, wherein the first edge is disposed proximate a portion of the tube wall; a seam proximate the first edge and the portion of the tube wall; a coupling across the seam configured to inhibit an exchange of a gas across the seam; a flap comprising the second edge and extending outward of the seam; and a ligament.

2. The aircraft evacuation system integrated spoiler of claim 1, wherein the flap further comprises an angle θ between the flap and an outer surface of the tube wall wherein the ligament is configured to restrain the angle θ at a maximum.

3. The aircraft evacuation system integrated spoiler of claim 2, wherein the flap is configured to pivot about the seam through the angle θ in response to an aerodynamic force.

4. The aircraft evacuation system integrated spoiler of claim 1, wherein the flap further comprises a first dimension W perpendicular to the second edge and extending from the seam a distance of less than eight inches (twenty and three-tenths centimeters).

5. The aircraft evacuation system integrated spoiler of claim 4, wherein the side tube comprises a second dimension D parallel to the side tube and wherein the flap extends along the seam over a percentage of the second dimension D.

6. The aircraft evacuation system integrated spoiler of claim 5, wherein the first dimension W varies with respect to the second dimension D.

7. The aircraft evacuation system integrated spoiler of claim 6, wherein the variation of the first dimension W with respect to the second dimension D is linear.

8. The aircraft evacuation system integrated spoiler of claim 1, wherein the coupling comprises a two part adhesive.

9. An evacuation system of an aircraft structure comprising: an evacuation slide coupled to the aircraft structure, the evacuation slide comprising: a first side tube having a first tube wall; a second side tube having a second tube wall, the second side tube and the first side tube defining a lane; a tube extending between the first side tube and the second side tube; and a first integrated spoiler comprising: the first tube wall, further comprising a first edge and a second edge, wherein the first edge is disposed proximate a portion of the first tube wall; a first seam proximate the first edge and the portion of the first tube wall; a first coupling across the first seam configured to inhibit an exchange of a gas across the first seam; a first flap comprising the second edge and extending outward of the first seam; and a first ligament.

10. The evacuation system of the aircraft structure of claim 9, further comprising a second integrated spoiler comprising: the second tube wall, further comprising a third edge and a fourth edge, wherein the third edge is disposed proximate a portion of the second tube wall;
    a second seam proximate the third edge and the portion of the second tube wall;
    a second coupling across the second seam configured to inhibit the exchange of a gas across the second seam;
    a second flap comprising the fourth edge and extending outward of the second seam; and
    a second ligament.

11. The evacuation system of the aircraft structure of claim 9, wherein the first flap further comprises an angle θ between the first flap and an outer surface of the first tube wall wherein the first ligament is configured to restrain the angle θ at a maximum.

12. The evacuation system of the aircraft structure of claim 11, wherein the first flap is configured to pivot about the first seam through the angle θ in response to an aerodynamic force.

13. The evacuation system of the aircraft structure of claim 12, wherein the first flap further comprises a first dimension W perpendicular to the second edge and extending from the first seam a distance of less than eight inches.

14. The evacuation system of the aircraft structure of claim 13, wherein the first side tube comprises a second dimension D parallel to the first side tube and wherein the first flap extends along the first seam over a percentage of the second dimension D.

15. The evacuation system of the aircraft structure of claim 14, wherein the first dimension W varies with respect to the second dimension D by a variation.

16. The evacuation system of the aircraft structure of claim 9, further comprising a center tube disposed between the first side tube and the second side tube, the first side tube and the center tube defining a first lane, the center side tube and the second side tube defining a second lane.

17. The evacuation system of the aircraft structure of claim 9, wherein the first side tube, the second side tube, and the first flap are substantially in parallel.

\* \* \* \* \*